United States Patent [19]

Nagata

[11] Patent Number: 5,205,720
[45] Date of Patent: Apr. 27, 1993

[54] METHOD AND APPARATUS FOR PRODUCING COMPRESSED AIR AND WATER PUMPING APPARATUS UTILIZING THE PRODUCED AIR

[76] Inventor: Tsugio Nagata, 16-6, Kohenjiminami 4-chome, Suginami-ku, Tokyo, Japan

[21] Appl. No.: 725,662

[22] Filed: Jul. 3, 1991

[30] Foreign Application Priority Data

Jul. 3, 1990 [JP] Japan .................. 2-174532

[51] Int. Cl.$^5$ .......................... F64F 11/00
[52] U.S. Cl. ........................ 417/328; 417/92; 417/101
[58] Field of Search ............ 417/92, 101, 328, 329, 417/100

[56] References Cited

U.S. PATENT DOCUMENTS

| | | | |
|---|---|---|---|
| 341,021 | 5/1886 | Kierter | 417/100 |
| 631,994 | 8/1899 | Montague | 417/100 |
| 643,863 | 2/1900 | Bryant | 417/100 |
| 778,608 | 12/1904 | Rogers | 417/100 |
| 1,005,616 | 10/1911 | Doose | 417/100 |
| 1,091,313 | 3/1914 | Erickson | 417/101 |
| 1,455,718 | 5/1923 | Delong | 417/100 |
| 2,840,004 | 6/1958 | Guenther et al. | 417/394 |
| 4,265,599 | 5/1981 | Morton | 417/101 |
| 4,426,846 | 1/1984 | Bailey | 60/398 |
| 4,719,754 | 1/1988 | Nishikawa | 417/100 |

FOREIGN PATENT DOCUMENTS

| | | |
|---|---|---|
| 0192246 | 8/1986 | European Pat. Off. . |
| 2406756 | 5/1975 | Fed. Rep. of Germany . |
| 56-113059 | 9/1981 | Japan . |
| 60-104779 | 6/1985 | Japan . |
| 60-111065 | 6/1985 | Japan . |
| 60-190679 | 9/1985 | Japan . |
| 60-224978 | 11/1985 | Japan . |
| 1-14426 | 3/1989 | Japan . |
| 1-20313 | 4/1989 | Japan . |

OTHER PUBLICATIONS

"Waves In Fluids", James Lighthill, Cambridge University Press.

Primary Examiner—Richard A. Bertsch
Assistant Examiner—Peter Korytnyk

[57] ABSTRACT

A method and apparatus for producing compressed air includes sealing air in a container capable of reducing its volume by external hydraulic pressure. A weight having a larger specific gravity than water is attached to the container to sink the container deep under water. Compressed air is produced when the volume of the container is reduced by hydraulic pressure, and is transferred into a recovery vessel connected to the container via a check valve. The weight is then separated from the container to cause the container to float on the water by the action of buoyancy. The compressed air can then be recovered from the recovery vessel.

17 Claims, 4 Drawing Sheets

METHOD AND APPARATUS FOR PRODUCING COMPRESSED AIR AND WATER PUMPING APPARATUS UTILIZING THE PRODUCED AIR

BACKGROUND OF THE INVENTION

1. Field of the Invention

The present invention relates to a method for the production of compressed air, to an apparatus for carrying out the method, and to a water pumping apparatus for use in hydroelectric power generation utilizing the compressed air produced by the method and apparatus.

2. Description of Prior Art

Energy available at present in the world relies heavily on coal, petroleum, and nuclear power, the use of which often results in environmental destruction. On the other hand, hydroelectric power, wind power or wave power whose power, has nothing to do with environmental destruction, has little or no prospect of great development.

OBJECTS AND SUMMARY OF THE INVENTION

One object of the present invention is to provide a method for producing compressed air serving as air expansion energy from natural resources and an apparatus for carrying out the method.

Another object of the present invention is to provide a water pumping apparatus for use in hydroelectric power generation utilizing air expansion energy of the compressed air obtained by the aforementioned method and apparatus.

To achieve the objects described above, from one aspect of the present invention there is provided a method for producing compressed air, which comprises sealing air in a container capable of reducing its volume by an external hydraulic pressure, attaching a weight having a larger specific gravity than water to the container to sink the container deep under water, inserting under pressure compressed air produced when the volume of the container is reduced by hydraulic pressure into a recovery vessel connected to the container via a check valve, separating the weight from the container to cause the container to float on the water by the action of buoyancy, and recovering the compressed air from the recovery vessel.

From another aspect of the present invention, there is provided an apparatus for carrying out the aforementioned method, which comprises a container having an air chamber in which air is sealed and capable of reducing the volume of the chamber by external hydraulic pressure, a recovery vessel connected to the container via a check valve for recovering compressed air produced when the volume of the chamber is reduced by the hydraulic pressure, and a weight attached to the container for sinking the container and vessel deep under water.

From still another aspect of the present invention, there is provided a water pumping apparatus for use in hydroelectric power generation utilizing compressed air, which comprises a container interposed between an upstream water reservoir of a hydroelectric power generating apparatus and a downstream water reservoir of the hydroelectric power generating apparatus for storing the water subjected to hydroelectric power generation, a piston slidably accommodated within the container for dividing the interior of the container into a water tank chamber and an air expansion chamber, a water inlet tube connected to the water tank chamber via a first control valve for regulating the flow rate of the water supplied from the downstream water reservoir into the water tank chamber, a water feed pipe connected to the water tank chamber via a second control valve for regulating the flow rate of the water fed under pressure from the water tank chamber into the upstream water reservoir, and a recovery vessel containing compressed air therein and connected via a flow regulating valve to the air expansion chamber for discharging the compressed air contained in the recovery vessel into the air expansion chamber to cause the piston to slide in a direction increasing the volume of the air expansion chamber.

The present invention utilizes three physical properties, i.e. the fact that a substance at a high position has a higher potential energy than a substance at a low position, that buoyancy acts on a substance in fresh water and that hydraulic pressure increases in proportion to the depth of water.

To be specific, a container having air sealed therein is sunk deep under water by using a weight having a larger specific gravity than water, thereby compressing the air in the container by means of hydraulic pressure, the weight is caused to be free from the container to allow the container to float on the water by the action of buoyancy of a buoyant body, and then the compressed air is recovered from the container. Thus, the present invention uses specific gravity, hydraulic pressure and buoyancy, all obtained from natural resorces.

The air expansion energy of the recovered compressed air can be applied to a hydroelectric power generating apparatus. In this case, the water once subjected to power generation can be repeatedly recycled. Therefore, the hydraulic power generation otherwise limited by the amount of rain water can be utilized to the maximum possible extent. In addition, the hydroelectric power generation can be applied to private power generation in a multistory building, for example. The air expansion energy of the compressed air can be used in the form of power for driving and propelling vehicles, or as a cooling means, utilizing the phenomenon that when gas is expanded it absorbs the environmental heat. When the compressed air is mixed with fuel in an internal combustion engine, the amount of the fuel can be reduced. The compressed air is also applicable to a sprayer. Thus, since the air expansion energy of the compressed air can be converted into various kinds of energy, the present invention can reduce the amount of fossil fuels used at present to a great extent.

The above and other objects, characteristic features and advantages of the present invention will become more apparent from the description to be given hereinbelow with reference to the accompanying drawings.

DETAIL DESCRIPTION OF THE PREFERRED EMBODIMENTS

Now, the present invention will be described in detail with reference to the accompanying drawings.

Figure 1:
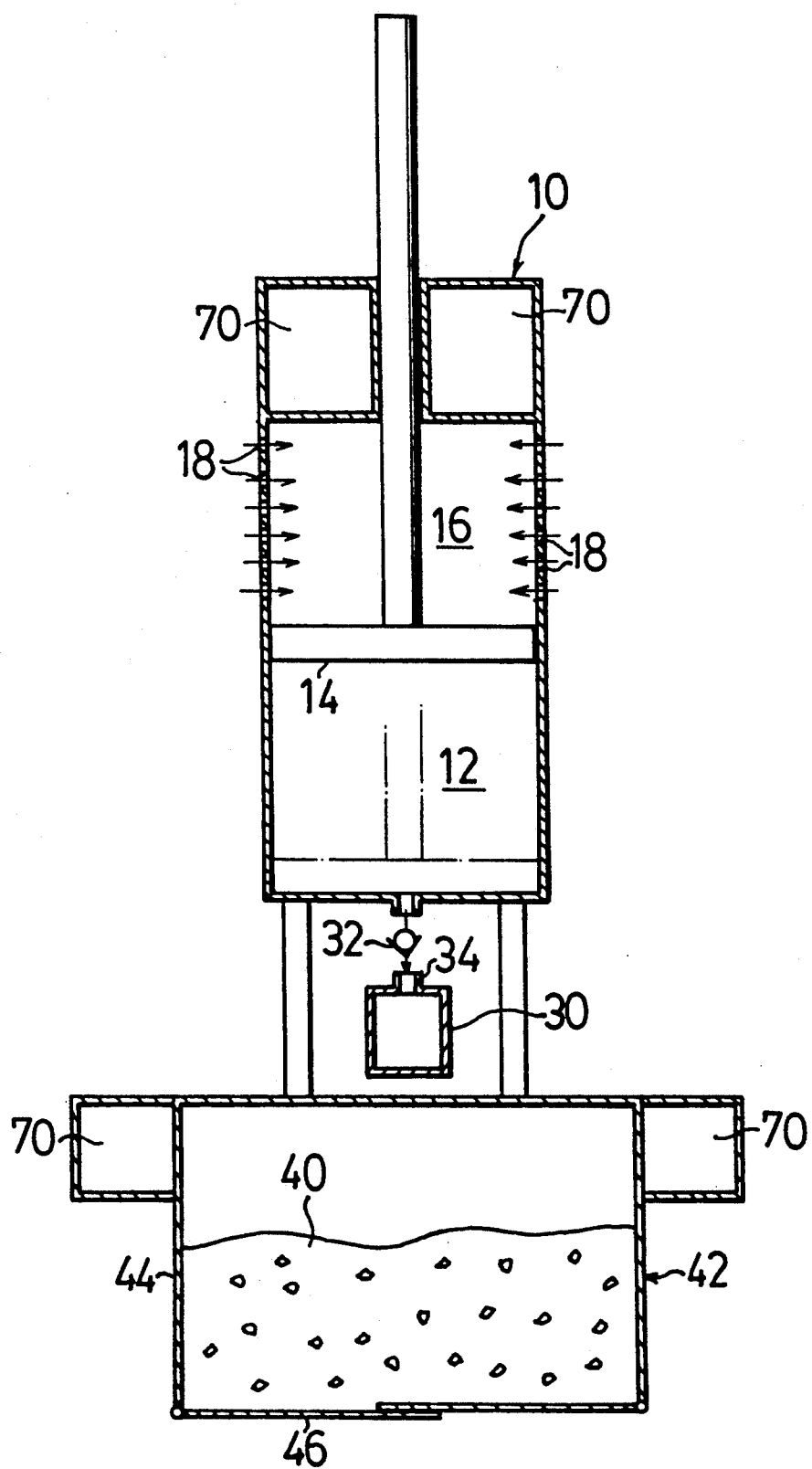
FIG. 1 is a schematic cross section illustrating one embodiment of an apparatus for producing compressed air according to the present invention, with a clamping device omitted.
Figure 2:
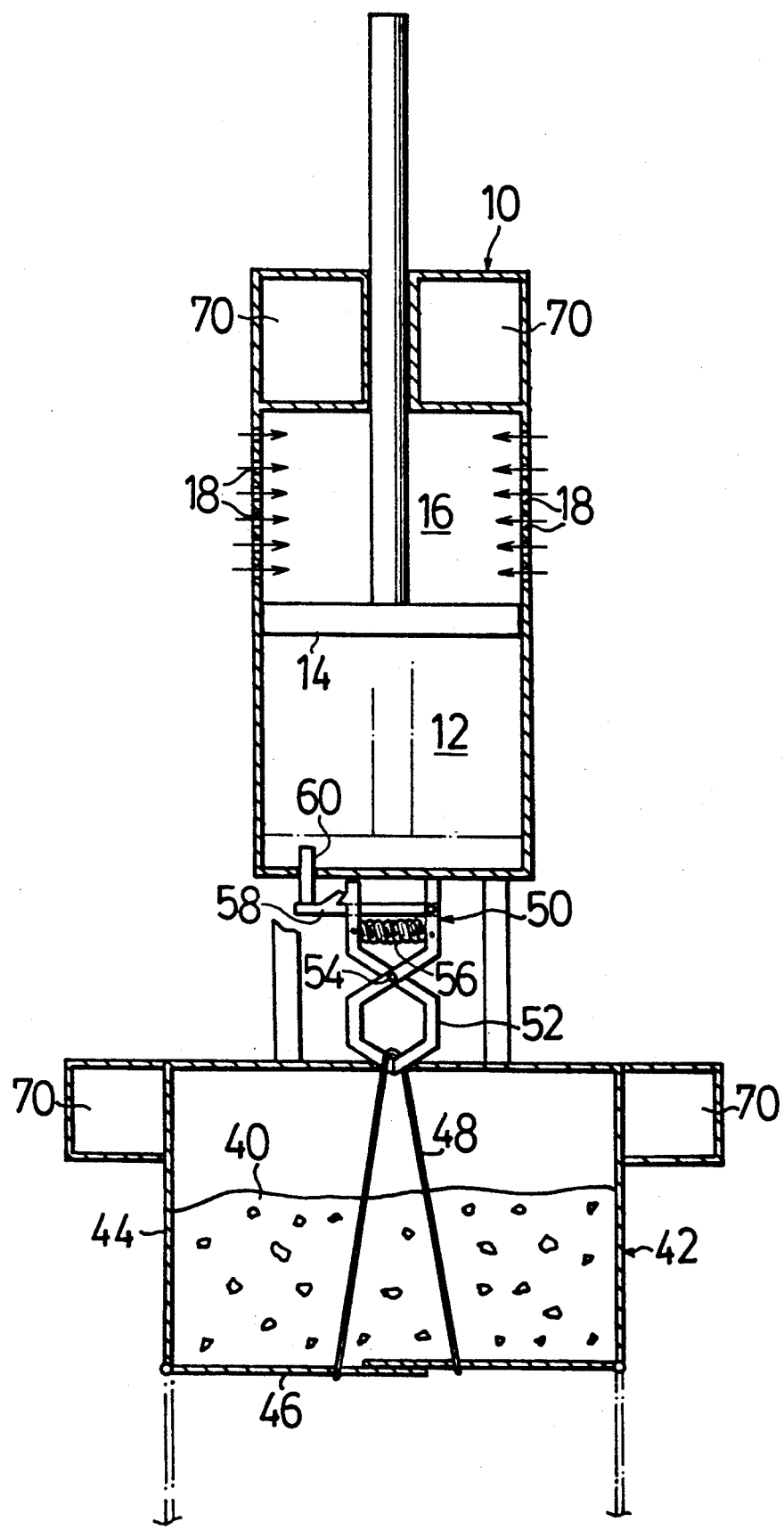
FIG. 2 is a schematic cross section illustrating the apparatus of FIG. 1 with a compressed air recovery vessel omitted.

FIGS. 1 and 2 are schematic cross-sectional views illustrating one embodiment of the apparatus for producing compressed air according to the present invention. The apparatus 1 includes a container body 10 having an air chamber 12 sealing air therein, and is capable of reducing its volume by hydraulic pressure. A compressed air recovery vessel 30 is connected to the air chamber 12 via a check valve 32 and adapted to receive the compressed air therein when the volume of the air chamber 12 is reduced by hydraulic pressure. A weight 40 is mounted on the container body 10 and adapted to sink the container body 10 and recovery vessel 30 deep under water.

The cylindrical container body 10 has a compression piston 14 disposed therein dividing the interior of the container body 10. The piston 14 is slidable upward and downward along the inner wall of the container body 10 in the air chamber 12. A water chamber 16 is formed with a plurality of water inlet ports 18 for introducing water thereinto. When the container body 10 is caused to sink deep under water, the external water enters the water chamber 16 disposed on the upper side of the compression piston 14 through the water inlet ports 18 under pressure. The compression piston 14 moves toward the air chamber 12, urged by the hydraulic pressure of the water entering the water chamber 16 to thereby compress the air in the air chamber 12. The air chamber 12 is connected to a compressed air recovery vessel 30 through a connecting tube 34. The connecting tube 34 is provided with a check valve 32. The compressed air recovery vessel 30 has a very small volume compared with that of the air chamber 12 before it is reduced in volume, so that the compressed air supplied into the recovery vessel 30 can be maintained intact. The check valve 32 acts such that when the pressure in the air chamber 12 is higher than that in the compressed air recovery vessel 30, the air in the air chamber 12 is permitted to flow into the air recovery vessel 30 and that when the pressure relation is reversed, the compressed air in the air recovery vessel 30 does not flow back into the air chamber 12. The recovery vessel 30 can be detached from the container body 10 for replacement.

Figure 3:
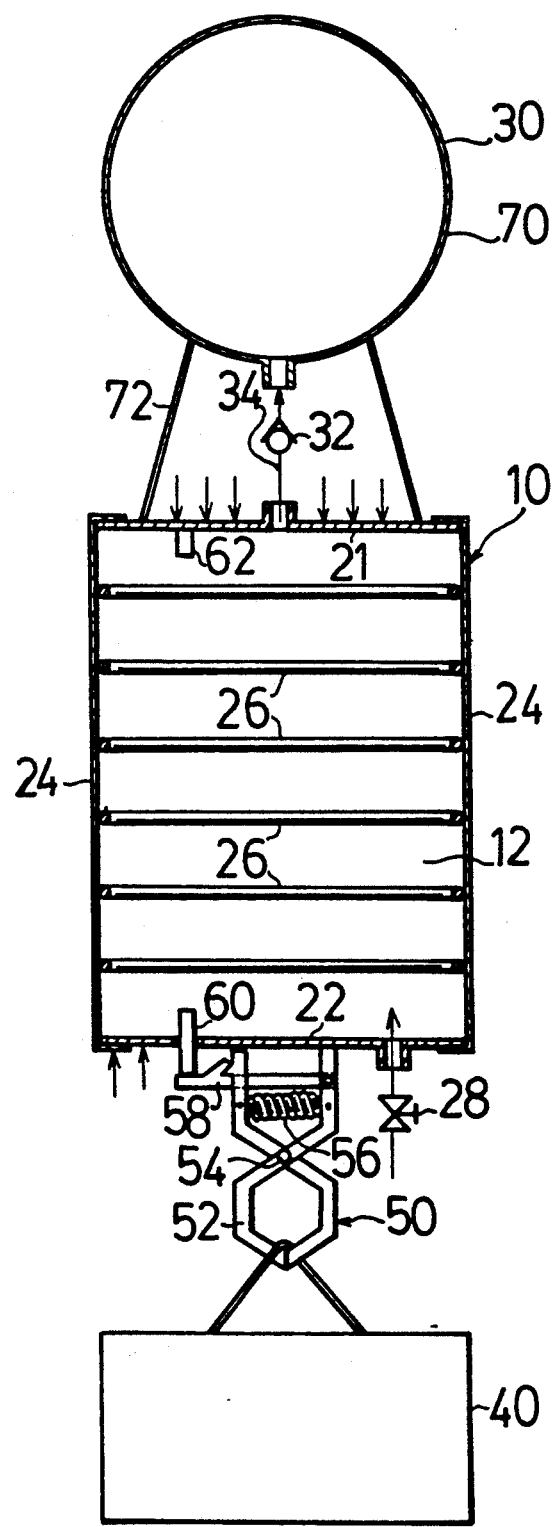
FIG. 3 is a schematic cross section illustrating another embodiment of an apparatus for producing compressed air according to the present invention.

FIG. 3 shows another embodiment of the apparatus for producing compressed air according to the present invention. In this embodiment, the outer wall of the container body 10 can be deformed to be expanded and contracted in the vertical direction by the external hydraulic pressure. The inside space of the container body 10 serves as an air chamber 12. When the outer wall is contracted by the external hydraulic pressure, the volume of the air chamber 12 can be reduced. The structure of the container body 10 will be described in more detail. It is constructed in a sealed state such that an upper plate 21 and a lower plate 22 are joined together through a cloth material 24 and such that a plurality of annular reinforcement member 24 are sewn to the cloth member 26 so that it is expanded into a cylindrical configuration when air having a higher pressure than the atmospheric pressure is introduced into the air chamber 12. The cloth material 24 is formed of a material which is strong in tensile stress and is water- and air-impermeable. The reinforcement members 26 are strong against a compressive force and are hardly deformed. The air chamber 12 is provided with an air inlet valve 28 adapted to take air into the air chamber 12. The upper plate 21 of the container body 10 is connected to a compressed air recovery vessel 30 via a connecting tube 34. The connecting tube 34 is provided with a check valve 32 which has the same function as the check valve 32 of the previous embodiment. Although the container body 10 of this embodiment has a hollow cylindrical configuration, it is preferable that it has a hollow spherical configuration so that it can bear the hydraulic pressure of the deep sea.

In any of the embodiments described above, a weight 40 is detachably attached to the container body 10 in order to sink the container body 10 deep under water. The weight 40 is detached from the container body 10 when the volume of the air chamber 12 is reduced to the maximum possible extent by hydraulic pressure. The container body 10 of the embodiment shown in FIGS. 1 and 2 is provided with a buoyant body 70 so that it can float on the water by means of buoyancy when the sink weight 40 has been detached from the container body 10, whereas the compressed air recovery vessel 30 of the embodiment shown in FIG. 3 concurrently serves as the buoyant body 70, which will be described later.

The weight 40 is detached from the container body 10 when the volume of the air chamber 12 is reduced to the maximum possible extent, i.e. when the surface of the compression piston 14 comes into contact with the bottom of the air chamber 12 in the embodiment of FIGS. 1 and 2 or when the upper and lower plates 21 and 22 come into contact with each other in the embodiment of FIG. 3.

In the embodiment shown in FIGS. 1 and 2, the weight 40 is accommodated within a weight mounting device 42, which comprises a casing 44 having a bottom portion 46 capable of being opened by the weight of the weight 40. The bottom portion 46 is closed by a wire 48 clamped by a clamping device 50 without being accidentally opened.

The clamping device 50 comprises wrench like holding metal pieces 52 which have clamp portions and proximal portions pivoted on a pin 54. When the proximal portions are away from each other, the clamp portions are also away from each other. One of the proximal portions is fixed to a lower part of the container body 10, whereas the other of the proximal portions is left free. Between the proximal portions a spring body 56 is interposed for biasing the free proximal portion in a direction away from the fixed proximal portion. A lock lever 58 is provided to lock the free proximal portion so as not to be moved away from the fixed proximal end by the biasing force of the spring body 56. An unlocking pin 60 has an upper end thereof projecting into the a air chamber 12 and the lower end thereof engaged with the lock lever 58. Therefore, when the upper end of the unlocking pin 60 is depressed by the compression piston 14, the lock lever 58 is disengaged from the free proximal end and, as a result, the free proximal end is biased by the biasing force of the spring body 56 in the direction away from the fixed proximal end to open the clamp portions. Consequently, the wire 48 is released from the clamp portions and the bottom portion 46 of the casing 42 is opened by the weight of the weight 40, thereafter the weight 40 is discharged out of the casing 42. Gravel on the seashore can be used as the weight 40.

The same clamping device 50 as in the embodiment of FIGS. 1 and 2 is used in the embodiment of FIG. 3, provided that the weight 40 is formed of a bag filled with gravel and suspended from the clamping device 50.

In the apparatus shown in FIGS. 1 and 2, both the container body 10 and the casing 44 are provided with buoyant chambers acting as the buoyant body 70. Since a compressed stress applied to the buoyant chambers becomes larger in proportion as the apparatus sinks deeper under water, the structural members constituting the buoyant chambers are required to be rigid. In order to make the difference between the internal pressure and the external pressure as small as possible at the bottom of the water level which the apparatus reaches, it is desirable to fill the buoyant chambers with compressed air in advance.

In the apparatus of FIG. 3, the compressed air recovery vessel 30 serves concurrently as the buoyant body 70, which has a hollow spherical configuration and is connected to an upper portion of the container body 10 via rods 72. Due to the dual function of the recovery vessel 30, the pressure of the air contained therein is increased by repeating the recovery operation in view of the volume of the recovery vessel 30 and, therefore, the apparatus of FIG. 3 can bear the higher hydraulic pressure in deeper water and can be suitably used for obtaining a compressed air of high pressure.

The operation of the apparatus of FIGS. 1 and 2 will now be described. The compression piston is pulled to the highest position, and then the air recovery vessel is attached to the container body 10. After the bottom portion of the casing 44 is closed, the weight 40 is introduced into the casing 44. The casing 44 is then attached to the lower part of the container body 10. Thereafter the apparatus is hung above the surface of the sea by means of a hanging chain (not shown) and then separated from the hanging chain. As a result, the whole apparatus is sunk deep under the water by gravity. At that time, water flows into the water chamber 16 through the water inlet ports 18 due to hydraulic pressure to push the compression piston 14 down, thereby compressing the air in the air chamber 12. The hydraulic pressure increases as the apparatus sinks deeper, and the lower end of the compression piston 14 is eventually brought to the bottom portion of the air chamber 12. Thus, all air in the air chamber 12 is inserted into the recovery vessel 30 under pressure. Since the recovery vessel 30 is provided with the check valve 32, a decrease of air pressure in the air chamber 12 does not cause the compressed air in the recovery vessel 30 to flow back to the air chamber 12. When the lower end of the compression piston 14 reaches the bottom portion of the air chamber 12, the clamped state of the clamping device 50 is released and the bottom portion 46 of the casing 44 is opened to drop the weight 40. As a result, the buoyancy acts on the whole apparatus due to the function of the buoyant chambers 70, and the whole apparatus floats to the surface of the sea automatically, thus producing compressed air.

Operation of the apparatus shown in FIG. 3 will now be described.

The air inlet valve 28 of the container body 10 is opened and the weight 40 is attached to the lower plate 22. When the apparatus with the upper plate 21 directed upward is hung by a crane (not shown), air automatically flows into the air chamber 12 of the container body 10 through the air inlet valve 28 owing to the function of the weight 40 to expand the container body 10 into a cylindrical configuration. Then, the valve 28 is closed. The weight 40 is attached to the clamping device 50 of the weight mounting device 42. The whole apparatus is slowly lowered onto the surface of water and separated from the crane. The whole apparatus slowly sinks under water. When the hydraulic pressure increases as the apparatus sinks deep under water, air in the air chamber 12 is compressed and the air chamber 12 is reduced in volume. However, the air chamber 12 is not reduced in size in the horizontal direction because of the presence of the annular reinforcement members 26, but is in the vertical direction, and consequently exhibits a vertically compressed appearance as a whole. As a result, air in the air chamber 12 is compressed to an extent that the internal pressure is substantially equal to the external hydraulic pressure, and part of the compressed air is stored in the air recovery vessel 30. As the apparatus sinks deeper, the volume of the air chamber 12 is further reduced by the hydraulic pressure and most of the air in the air chamber 12 is inserted under pressure into the air recovery vessel 30. At the same time, a projection 62 attached to the upper plate 21 pushes down the unlocking pin 60 mounted on the lower plate 22 to release the locked state of the lock lever 58, and the clamping portion of the holding metal piece 52 is opened by means of the biasing force of the spring body 56 to release the weight 40. When the weight 40 has been detached from the apparatus, the whole apparatus begins to float upwardly due to the function of the recovery vessel 30. At this time, since the recovery vessel 30 keeps a high pressure due to the provision of the check valve 32, it is lifted by the crane when it finally floats on the surface of the water. When the air inlet valve 28 is opened, air flows into the air chamber 12 to restore the apparatus to its original shape. By repeating the above processes without removing the air recovery vessel 30 from the container body 10, the amount of compressed air corresponding to the volume of the recovery vessel 30 can be recovered.

Figure 4:
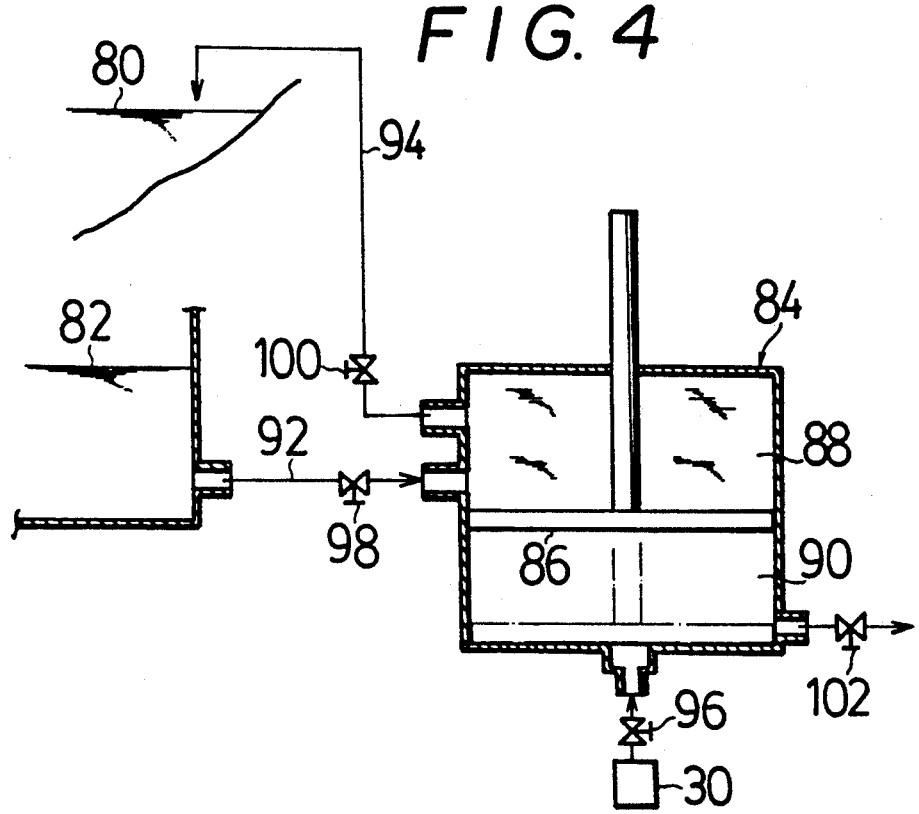
FIG. 4 is a schematic cross section illustrating one embodiment of a water pumping apparatus for use in hydroelectric power generation utilizing the compressed air according to the present invention.
Figure 5:
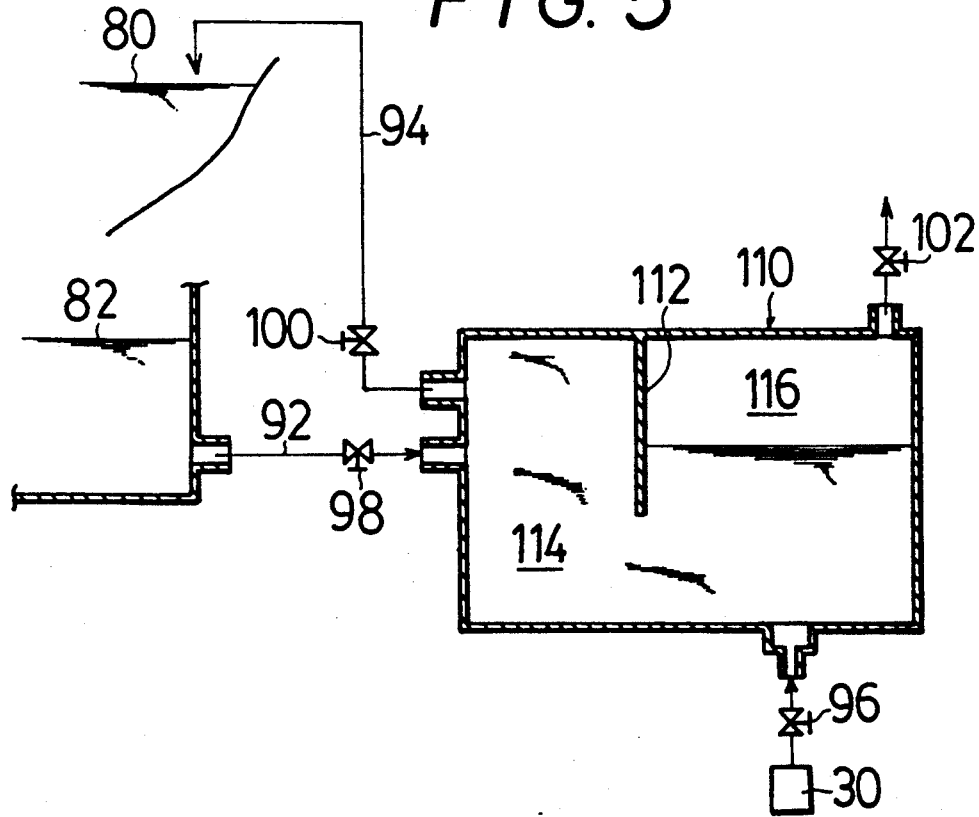
FIG. 5 is a schematic cross section illustration of another embodiment of a water pumping apparatus according to the present invention.

FIGS. 4 and 5 show a water pumping apparatus for use in hydroelectric power generation utilizing the compressed air produced by the aforementioned compressed air production apparatus.

The water pumping apparatus of FIG. 4 comprises a container 84 disposed between an upstream water reservoir 80 of a hydroelectric power generating apparatus (not shown) and a downstream water reservoir 82 for reserving used water. The interior of the container 84 is divided into an upper water tank chamber 88 and a lower air expansion chamber 90 by a piston 86 which is slidable in the vertical direction within the container 84. The water tank chamber 88 is connected to a water inlet tube 92 for flowing water into the water tank chamber 88 from the downstream water reservoir 82 and also to a water feed tube 94 for feeding under pressure the water reserved in the chamber 88 to the upstream water reservoir 80. The air expansion chamber 90 is provided with an air recovery vessel 30 containing compressed air for pushing up the piston 86 in order to expand the volume of the air expansion chamber 90. The recovery vessel 30 contains the compressed air recovered by the aforementioned compressed air producing apparatus. Between the air recovery vessel 30 and the air expansion chamber 90, a first control valve 96 is disposed. By adjusting the first control valve 96, the amount of compressed air to be discharged into the air expansion chamber 90 from the recovery vessel 30 is regulated. In FIG. 4, reference numeral 98 denotes a second control valve disposed at the water inlet tube 92, numeral 100 denotes a third control valve disposed at the water feed tube 94, and numeral 102 denotes a fourth control valve disposed at an air vent pipe. These valves are operated to control the flow of water or air.

The water pumping apparatus of FIG. 5 comprises a container 110 disposed between an upstream water reservoir 80 of a hydroelectric power generating apparatus (not shown) and a downstream water reservoir 82 for reserving the used water. The interior of the container 84 is divided by a partition wall 112 into a water tank chamber 114 and an air expansion chamber 116, which chamber communicate with each other at the lower part of the container 110. The water tank chamber 114 is connected to a water inlet tube 92 for flowing water into the water tank chamber 114 from the downstream water reservoir 82 and also to a water feed tube 94 for feeding under pressure the water reserved in the chamber 114 to the upstream water reservoir 80. The air expansion chamber 116 is provided with a recovery vessel 30 containing compressed air for expanding the volume of the air expansion chamber 116. The apparatus of FIG. 5 is designed such that air bubbles of the compressed air to be discharged into the container 110 from the recovery vessel 30 rise upward by means of buoyancy and are pooled in the air expansion chamber 116 divided by the partition wall 112. The remaining construction thereof is the same as that of the apparatus of FIG. 4.

The operation of the water pumping apparatus shown in FIGS. 4 and 5 will be described.

First, used water, i.e. water already subjected to hydroelectric generation, is caused to flow into the water tank chamber 88 or 114 from the downstream water reservoir 82 through the water inlet tube 92 until the water tank chamber 88 or 114 is filled with the water. The air in the air expansion chamber 90 or 116 is all drafted by opening the fourth control valve 102. The second and fourth control valves 98 and 102 are closed, while the third control valve 100 is opened. The first control valve 96 of the recovery vessel 30 is mounted to air expansion chamber 90 or 116 in a slightly open state. The apparatus of FIG. 4 represents a case where the piston is used. Since the pressure of compressed air discharged from the recovery vessel 30 is much greater than the hydraulic pressure in the water tank chamber 88, it pushes the piston 86 upward. The apparatus of FIG. 5 represents a case where the piston is not used. Air bubbles of the compressed air discharged from the recovery vessel 30 rise in the water filled in the water tank chamber 114 while expanding its volume and are pooled in the air expansion chamber 116. In either case, the volume of the air expansion chamber 90 or 116 is gradually increased. Water rises through the water feed tube 94 by the amount equivalent to the increased volume of the air expansion chamber. When the tube 94 has been filled with water, the water flows into the upstream water reservoir 80. When the discharge of the compressed air from the recovery vessel 30 has been substantially stopped, the third control valve 100 is closed and the fourth control valve 102 is opened to draft air, and the second control valve 98 is opened to introduce the water which has already been subjected to hydroelectric power generation into the water tank chamber 88 or 114. When all air in the air expansion chamber 90 or 116 has been drafted, the second and fourth control valves 98 and 102 are closed, a new recovery vessel 30 is attached, the third control valve 100 is opened and then the aforementioned procedure is repeated. By repeating the aforementioned procedure, water which has already been subjected to hydroelectric power generation can be sent back to the upstream water reservoir 80, so that it can be repeatedly used for hydroelectric power generation.

Although the present invention has been described in the form of the preferred embodiments, it should be noted that the invention is not limited to the preferred embodiments.

What is claimed is:

1. An apparatus for compressing air, comprising:
   a container, said container defining an air chamber therein that is capable of having its volume reduced by external hydraulic pressure;
   a recovery vessel connected to said container by a check valve for recovering compressed air produced when the volume of said chamber is reduced by hydraulic pressure; and
   means for sinking said container and said recovery vessel under water, said means comprising a weight attached to said container.

2. The apparatus of claim 1, and further comprising means for detaching said weight from said container when the volume of said air chamber has been reduced a predetermined maximum amount by the hydraulic pressure.

3. The apparatus of claim 2, and further comprising a buoyant body connected to said container to raise said container and said recovery vessel by buoyancy after said weight has been released.

4. The apparatus of claim 2, wherein said means for detaching comprises a clamping device that is automatically operated to detach said weight when said air chamber has been reduced the predetermined maximum amount.

5. The apparatus of claim 4, wherein:
   said container has a piston slidable therein, said piston dividing said container into said air chamber and a water chamber; and
   said water chamber has a plurality of inlet ports to allow water to flow therein, whereby hydraulic pressure can displace said piston to reduce the volume of said air chamber.

6. The apparatus of claim 5, wherein said weight is provided inside an openable weight mounting device opened by opening said clamping device of said means for detaching.

7. The apparatus of claim 6, wherein said means for detaching further has a lock lever locking said clamping device in a closed position and an unlocking pin extending into said container for engaging said lock lever to open said clamping device upon engagement of said locking pin by said piston.

8. The apparatus of claim 4, wherein said container is unidirectionally expandable and contractable under hydraulic pressure.

9. The apparatus of claim 8, wherein said weight is provided inside an openable weight mounting device opened by opening said clamping device of said means for detaching.

10. The apparatus of claim 9, wherein said means for detaching further has a lock lever locking said clamping device in a closed position and an unlocking pin extending into said container for engaging said lock lever to open said clamping device upon engagement of said locking pin by a portion of said container due to contraction thereof.

11. The apparatus of claim 1, wherein:
said container has a piston slidable therein, said piston dividing said container into said air chamber and a water chamber; and
said water chamber has a plurality of inlet ports to allow water to flow therein, whereby hydraulic pressure can displace said piston to reduce the volume of said air chamber.

12. The apparatus of claim 1, wherein said container is unidirectionally expandable and contractable under hydraulic pressure.

13. An apparatus for compressing air, comprising:
a container, said container defining an air chamber therein that is capable of having its volume reduced by external hydraulic pressure;
a recovery vessel connected to said container by a check valve for recovering compressed air produced when the volume of said chamber is reduced by hydraulic pressure;
a weight connected to said container and said recovery vessel; and
a release mechanism for automatically releasing said weight after said air chamber has been reduced in volume a predetermined amount.

14. The apparatus of claim 13, and further comprising a buoyant body connected to said container to raise said container and said recovery vessel by buoyancy after said weight has been released.

15. The apparatus of claim 13, wherein:
said container has a piston slidable therein, said piston dividing said container into said air chamber and a water chamber; and
said water chamber has a plurality of inlet ports to allow water to flow therein, whereby hydraulic pressure can displace said piston to reduce the volume of said air chamber.

16. The apparatus of claim 13, wherein said container is unidirectionally expandable and contractable under hydraulic pressure.

17. A method of compressing air, comprising:
sealing air in a container that is capable of having its volume reduced by external hydraulic pressure;
attaching a weight having a larger specific gravity than water to the container to sink the container under water;
transferring, under pressure, compressed air produced by hydraulic pressure reducing the volume of the container through a check valve and into a recovery vessel connected to the container;
separating the weight from the container to cause buoyancy to cause the container to rise and float on the water; and
recovering the compressed air from the recovery vessel.

* * * * *